O. DAVIS.
Bee Hive.
No. 79,734.
Patented July 7, 1868.
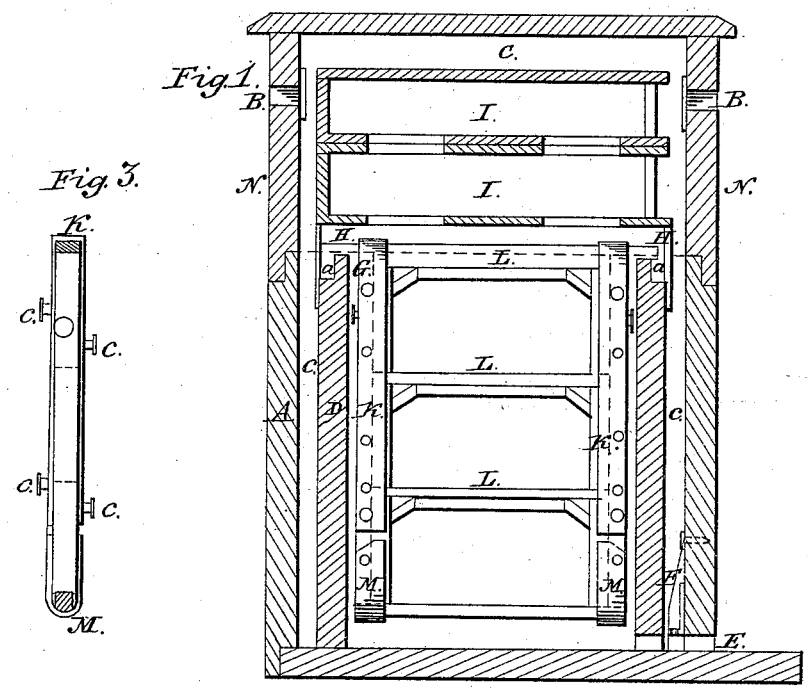
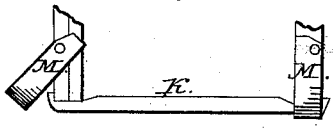
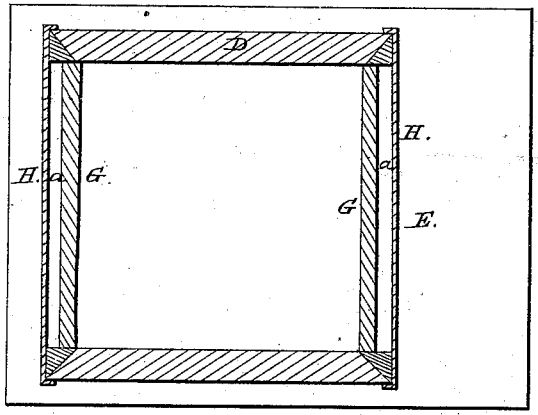
WITNESSES
INVENTOR
Owen Davis
per
Alexander H Mason
Attorney.
N. PETERS, PHOTO-LITHOGRAPHER, WASHINGTON, D.C.

United States Patent Office.

OWEN DAVIS, OF NEWTON, IOWA.

Letters Patent No. 79,734, dated July 7, 1868.

IMPROVEMENT IN BEE-HIVES.

The Schedule referred to in these Letters Patent and making part of the same.

TO ALL WHOM IT MAY CONCERN:

Be it known that I, OWEN DAVIS, of Newton, in the county of Jasper, and in the State of Iowa, have invented certain new and useful Improvements in Bee-Hives; and do hereby declare that the following is a full, clear, and exact description thereof, reference being made to the accompanying drawings, and to the letters of reference marked thereon.

In the annexed drawings, forming part of this specification—

Figure 1 represents a vertical section,

Figure 2 a plan view of the inner case.

Figure 3 represents an end view of one of the comb-frames, and

Figure 4 a view of the lower part of one of the frames, showing how they can be separated.

In the annexed drawings, A represents the outer hive or casement, in the top, N, of which are two air-holes, B B, covered with wire cloth, to assist in ventilating the inner hive or box, D, which latter is so arranged that there is an air-space, C, all around between the two hives. The space C is covered at the opening, E, to the hives with a perforated metallic substance or wire cloth, F. The arranging of the two boxes or hives in combination with air-space, is especially useful in protection against heat or cold.

The inner hive or box, D, is so arranged that two of its sides are shorter than the other, and form a kind of bar, G, on which the larger frames are supported. The short sides are lengthened with metal plates, H, to make them of the same height as the other two sides, leaving a space, $a$, between the bar and plate, as shown in fig. 1. On top of the inner hive D are two surplus-honey boxes, I I. The comb-frames used in my hive are provided with a vertical groove on each side, within which are slid the small frames L, the material of which they are composed, or the manner of forming the grooves, being immaterial. The comb-frame K is also provided with pins or flanges, $b\ b$, on its sides, to prevent the bees from waxing them together, as shown in fig. 3. It is also provided with a stirrup, M, to hold the small frames up, if they are inserted from the bottom.

In the upper right and left-hand corner of the small frames L there is a brace, $c$, which is provided with a comb-guide extension, $d$, extending from the comb-guide $e$, to guide the bees in building their combs down to the end-bar of the small bar. The top part of the larger frame, K, extends on both sides, to rest on the bar G, and if constructed of metal, they are hollow where they rest on this bar, by means of which the bees are prevented from waxing the frame, except only where the sharp edges rest on the bar.

Having thus fully described my invention, what I claim as new, and desire to secure by Letters Patent, is—

1. The combination of the boxes A and D, boxes I I, and comb-frames K, when the several parts are constructed and used as herein specified.

2. A comb-frame whose sides are provided with vertical grooves, within which are inserted small frames L, that are provided with comb-guides $e$ and braces $c\ c$, substantially as shown and described.

In testimony that I claim the foregoing, I have hereunto set my hand and seal, this 4th day of February, 1868.

OWEN DAVIS. [L. S.]

Witnesses:
P. A. SANKY,
J. M. RODGERS.